US008246781B2

(12) United States Patent
Ringold et al.

(10) Patent No.: US 8,246,781 B2
(45) Date of Patent: Aug. 21, 2012

(54) THERMOSETTING CREPING ADHESIVE WITH REACTIVE MODIFIERS

(75) Inventors: Clay E. Ringold, Decatur, GA (US); Karla D. Favors, Atlanta, GA (US); Dexter C. Johnson, Stone Mountain, GA (US); David F. Townsend, Grayson, GA (US); Thomas L. Wright, Oxford, GA (US); Cornel Hagiopol, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 55 days.

(21) Appl. No.: 13/037,681

(22) Filed: Mar. 1, 2011

(65) Prior Publication Data

US 2011/0284176 A1 Nov. 24, 2011

Related U.S. Application Data

(60) Provisional application No. 61/346,802, filed on May 20, 2010.

(51) Int. Cl.
*B31F 1/12* (2006.01)
(52) U.S. Cl. ..................................................... 162/111
(58) Field of Classification Search .................. 162/111, 162/164.3, 164.4, 158; 523/402; 524/210, 524/211, 56, 58, 503; 525/430; 528/335
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,058,873 A | 10/1962 | Keim et al. | |
| 3,125,552 A | 3/1964 | Loshack et al. | |
| 3,332,901 A | 7/1967 | Keim | |
| 3,567,734 A | 3/1971 | Johnson | |
| 3,640,841 A | 2/1972 | Winslow et al. | |
| 3,772,076 A | 11/1973 | Kim | |
| 3,879,257 A | 4/1975 | Gentile et al. | |
| 3,926,716 A | 12/1975 | Bates | |
| 3,966,684 A | 6/1976 | Espy et al. | |
| 3,966,694 A | 6/1976 | Espy et al. | |
| 4,063,995 A | 12/1977 | Grossman | |
| 4,109,094 A | 8/1978 | Trivedi et al. | |
| 4,300,981 A | 11/1981 | Carstens | |
| 4,304,625 A | 12/1981 | Grube et al. | |
| 4,440,898 A | 4/1984 | Pomplun et al. | |
| 4,501,640 A | 2/1985 | Soerens | |
| 4,528,316 A | 7/1985 | Soerens | |
| 4,684,439 A | 8/1987 | Soerens | |
| 4,722,964 A | 2/1988 | Chan et al. | |
| 4,788,243 A | 11/1988 | Soerens | |
| 4,883,564 A | 11/1989 | Chen et al. | |
| 4,886,579 A | 12/1989 | Clark et al. | |
| 4,994,146 A | 2/1991 | Soerens | |
| 5,025,046 A | 6/1991 | Soerens | |
| 5,179,150 A | 1/1993 | Furman, Jr. et al. | |
| 5,187,219 A | 2/1993 | Furman, Jr. | |
| 5,234,547 A | 8/1993 | Knight et al. | |
| 5,246,544 A | 9/1993 | Hollenberg et al. | |
| 5,326,434 A | 7/1994 | Carevic et al. | |
| 5,328,323 A | 7/1994 | Molison | |
| 5,338,807 A | 8/1994 | Espy et al. | |
| 5,370,773 A | 12/1994 | Luu et al. | |
| 5,374,334 A | 12/1994 | Sommese et al. | |
| 5,437,766 A | 8/1995 | Van Phan et al. | |
| 5,468,796 A | 11/1995 | Chen et al. | |
| 5,487,813 A | 1/1996 | Vinson et al. | |
| 5,490,903 A | 2/1996 | Chen et al. | |
| 5,633,309 A | 5/1997 | Warchol et al. | |
| 5,660,687 A | 8/1997 | Allen et al. | |
| 5,786,429 A | 7/1998 | Allen | |
| 5,833,806 A | 11/1998 | Allen et al. | |
| 5,846,380 A | 12/1998 | Van Phan et al. | |
| 5,902,862 A | 5/1999 | Allen | |
| 5,942,085 A | 8/1999 | Neal et al. | |
| 5,944,954 A | 8/1999 | Vinson et al. | |
| 5,994,449 A | 11/1999 | Maslanka | |
| 6,277,242 B1 | 8/2001 | Archer et al. | |
| 6,297,012 B1 | 10/2001 | Nakajima et al. | |
| 6,336,995 B1 | 1/2002 | Campbell | |
| 6,352,613 B1 | 3/2002 | Maslanka | |
| 6,808,597 B2 | 10/2004 | Allen | |
| 2002/0045704 A1 | 4/2002 | Luu et al. | |
| 2004/0211534 A1 | 10/2004 | Clungeon et al. | |
| 2005/0006040 A1 | 1/2005 | Boettcher et al. | |
| 2007/0000630 A1 | 1/2007 | Hassler et al. | |
| 2007/0151684 A1 | 7/2007 | Grigoriev et al. | |
| 2008/0257507 A1 | 10/2008 | Campbell | |
| 2009/0133846 A1 | 5/2009 | Grigoriev et al. | |

FOREIGN PATENT DOCUMENTS

EP 0739709 A1 10/1996

OTHER PUBLICATIONS

Y. Wu, et al. "Thermal Reactions of Fatty Acids with Diethylene Triamine", J. Am. Oil Chem. Soc., vol. 74, No. 1, 1997, pp. 61-64, AOCS Press.
V.A. Grigoriev, et al. "Development of New Methods for Characterizing Uniformity of Yankee Coatings", 13th Fundamental Research Symposium, Cambridge, Sep. 2005, pp. 187-212.
International Search Report and Written Opinion of the International Searching Authority for PCT/US2011/026625 mailed Feb. 8, 2012.

*Primary Examiner* — Mark Halpern
(74) *Attorney, Agent, or Firm* — Ram W. Sabnis

(57) ABSTRACT

A creping adhesive comprising a PAE composition comprising a reactive, light crosslinked polyamidoamine-epichlorohydrin polymer (PAE-type polymer) optionally in combination with a reactive modifier and the corresponding method for of creping cellulosic fiber webs with the adhesive.

34 Claims, 2 Drawing Sheets

THERMOSETTING CREPING ADHESIVE WITH REACTIVE MODIFIERS

CROSS-REFERENCE TO RELATED APPLICATION

This application claims priority to U.S. Provisional Patent Application No. 61/346,802 filed May 20, 2010, the disclosure of which is incorporated herein in its entirety by this reference.

FIELD OF THE INVENTION

The present invention broadly relates to papermaking and especially to the manufacture of grades of paper that are suitable for preparing paper towels, napkins, facial tissue, and bathroom tissue. The present invention is particularly directed to a new creping adhesive composition and to the use of that adhesive composition in the creping process.

BACKGROUND OF THE INVENTION

Paper is generally prepared by producing a slurry of cellulosic fibers in water fortified with a variety of additives and then removing most of the water to form a thin paper web. The structural integrity of the paper arises, in large part, from mechanical entanglement of the cellulosic fibers in the web and hydrogen bonding between fibers.

With paper intended for use as tissue and towel products, i.e., facial tissue, bathroom tissue, paper towels, napkins and the like, the level of structural integrity arising from the paper-making process conflicts somewhat with the degree of perceived softness that is necessary for consumer acceptance of such products.

The most common method of increasing the perceived softness of tissue and towel products is to crepe the paper. Creping is a means of mechanically compacting paper in the machine direction. The creping action imparts a fine, rippled texture to the sheet and also increases the bulk of the sheet, resulting in improved softness and absorbency, as well as other significant changes in many physical properties such as stretch, particularly when measured in the machine direction.

Creping is generally accomplished by fixing the cellulosic, paper web to a thermal drum dryer, generally called a Yankee dryer, by applying the web onto the surface of the dryer onto which has been sprayed a combination of an adhesive and a release agent, generally in the form of an aqueous solution, emulsion or dispersion. The web then is scraped backwardly upon itself and off of the Yankee dryer by means of a flexible blade, a so-called doctor blade. This blade is also sometimes referred to as a creping blade or simply a creper.

A Yankee dryer is a large diameter cylinder, generally an 8-20 foot diameter drum. Typically, the drum is heated with high pressure steam, providing a hot surface that completes drying the paper web at the end of the papermaking process. Prior to encountering the Yankee dryer, the paper web, formed by dewatering the cellulosic fiber slurry, is often transferred to a felt or fabric in a so-called press section where de-watering is continued to increase the consistency of the paper, usually to about 40 to 80%, either by mechanically compacting the paper or by some other de-watering method such as through-air-drying with hot air before feeding the Yankee dryer. Thereafter, the paper web is transferred in this partially dry, high solids condition to the surface of the Yankee dryer.

The process of creping causes a significant number of inter-fiber bonds to break, which alters many characteristics of the web and increases the perceived softness of the resulting tissue and towel products.

While some amount of adhesive build-up on the dryer surface is needed to control the creping (adhesion) process, excessive build-up of adhesive or streaks of adhesive on the dryer surface, which can occur with some types of adhesives, interferes with the creping process. Streaks can cause differences in the profile of adhesion across the width of the dryer and can result in humps or wrinkles in the finished roll of paper. Such build-up also may cause the creping blade to ride on the coating, causing blade chatter and reducing blade life. Sometimes a second doctor blade is positioned after the creping blade in order to remove excess creping adhesive and other residue.

Obtaining and maintaining the proper level of adhesion between the paper web and the Yankee dryer thus is an important factor in determining crepe quality. Generally, inadequate adhesion results in poor or non-existing creping, while excessive adhesion may result in poor sheet quality and interferes with stable operation. For example, webs which are insufficiently adhered to the Yankee dryer impact the control of the web as it travels in the space between the creping blade and the winder upon which a roll of the paper is being formed, causing problems in forming a uniform roll of paper. In particular, a loose sheet between the creper and the roll can cause wrinkles, foldovers, or weaving of the edges of the sheet in the rolled-up paper. Poorly formed rolls not only affect the reliability of the papermaking operation, but also the subsequent operations of tissue and towel manufacture in which the rolls are converted into the tissue and paper towel products.

The level of adhesion between the paper web and the Yankee dryer also impacts the efficiency at which the web is dried. Higher levels of adhesion reduce the impedance of heat transfer and cause the web to dry faster, enabling more energy efficient, higher speed operation, while poor adhesion interferes with the high processing speeds needed in today's papermaking operations.

Conventionally, a creping adhesive, alone or in combination with a release agent, is applied by spraying onto the surface of the Yankee dryer in order to provide the appropriate adhesion between the paper web and the dryer surface to produce the desired degree of crepe.

Over the years, various types of creping adhesives have been used to adhere the paper web to the dryer surface, i.e., to the surface of the Yankee dryer. Some examples of prior art creping adhesives are disclosed in U.S. Pat. Nos. 4,886,579; 4,528,316 and 4,501,640. Historically, one of the most common of the classes of polymers used as creping adhesives has been the thermosetting polyaminoamide-epichlorohydrin polymers (PAE polymers). Polyamidoamine-epichlorohydrin resins have been used as creping adhesives in the following patents: U.S. Pat. No. 5,338,807; U.S. Pat. No. 5,786,429; U.S. Pat. No. 5,902,862 and U.S. Pat. No. 5,944,954. These adhesives were designed to provide adhesion and good performance under high moisture conditions.

As known to those skilled in the art, different creped products, however, require different levels of adhesion, tack and rewetability for producing a product with consistent characteristics. For example a web destined for use as facial tissue will require a different level of adhesion, tack and rewetability compared to a web destined for making paper towels. Rewetability refers to the ability of moisture contained in the partially dried paper web to enhance the level of tack of the adhesive remaining on the dryer surface when the web is brought into contact with the heated dryer. A marked increase in tack is indicative of high rewetability. The rewetability of the adhesive is important because only a portion of the surface of the dryer is normally covered with a new application of adhesive on a given rotation of the Yankee dryer.

One problem that has confronted thermosetting polyamide-epichlorohydrin polymers when used as a creping adhesive is that polymer properties, including rewetability and the level of adhesion, are to a large extent restricted by the degree of epichlorohydrin cross-linking. This makes it difficult to vary polymer properties at the time the adhesive is being used in any given creping process. When conventional PAE-type adhesives encounter low moisture/high temperature conditions the residual adhesive on the dryer surface tends to become hard and brittle. This change in properties causes both an increase in adhesive build-up on the dryer surface and a decrease in adhesion (tack), leading to many of the problems outlined above.

Paper makers also have long recognized that different creping processes, different creping machines and paper webs based on different wood pulps have different adhesive demands if one is to optimize the creping process. Having an ability to control and change the amount of cross-linking to achieve an optimum level of adhesion for creping in a given papermaking process is a desired goal. Unfortunately, with prior art thermosetting polyamide-epichlorohydrin (PAE-type) polymers that degree of control has not been possible because the cross-linking of the adhesive occurs during the manufacturing process and it is impractical to have a number of water-soluble, thermosetting cationic polyamide-epichlorohydrin (PAE-type) polymers with different degrees of cross-linking in an attempt to tailor the creping adhesive to the creping process.

The prior art has attempted to remedy the shortcomings of the PAE-type polymers by altering the adhesive properties of the polymer with the addition of a release aid. A release aid provides lubrication to the doctor blade, moderates the adhesive properties of the adhesive coating to influence the release of the paper web from the Yankee dryer, and improves the absorbency of the paper product. Some release aids are non-polar, neutral and non-water soluble compounds. Cationic release aids are also available and comprise water insoluble materials, such as imidazoline quaternary salts.

Notwithstanding prior art efforts to improve the creping process, a need still exists for ways of managing the creping process by allowing more control over the level of adhesion and adhesive rewetability and thus the degree of adhesion between the tissue or towel substrate and the surface of the dryer from which the substrate is creped. A creping adhesive that provides a high level of adhesion to the Yankee drum under varying moisture conditions and particularly under low moisture conditions, while also providing high levels of water resistance for acceptable sheet uniformity and tissue quality, would be highly desirable.

The present invention focuses on an improved adhesive composition based on PAE-type polymers. In particular, the present invention provides a PAE-type adhesive for Groping and a related process for creping in which the character of the adhesive can be adapted and varied to control the adhesion level and thus better optimize a given creping process.

SUMMARY OF THE INVENTION

In one embodiment, the present invention provides a creping adhesive comprising a PAE polymer composition comprising a reactive, lightly crosslinked polyamidoamine-epihalohydrin polymer (PAE-type polymer) optionally in combination with a reactive modifier.

In another embodiment, the present invention relates to a method for creping a paper web which comprises: a) applying a creping adhesive to a drying surface; b) adhering a cellulosic fiber web to the drying surface; and c) dislodging the web from the drying surface; wherein the creping adhesive comprises a PAE polymer composition comprising a reactive, lightly crosslinked polyamidoamine-epihalohydrin (PAE-type) polymer optionally in combination with a reactive modifier.

In another embodiment, the present invention comprises a method for creping a paper web which comprises using a PAE polymer composition comprising a reactive, lightly crosslinked PAE-type polymer as a creping adhesive in combination with a release aid that includes a reactive modifier.

In another embodiment, the interaction between the reactive, lightly crosslinked PAE-type polymer and the reactive modifier is moderated by a phosphate compound.

These and other embodiments are set forth in the following description. Still other embodiments will be apparent to those of ordinary skill in the art after consideration of the specification.

DETAILED DESCRIPTION OF THE INVENTION

Figure 1:
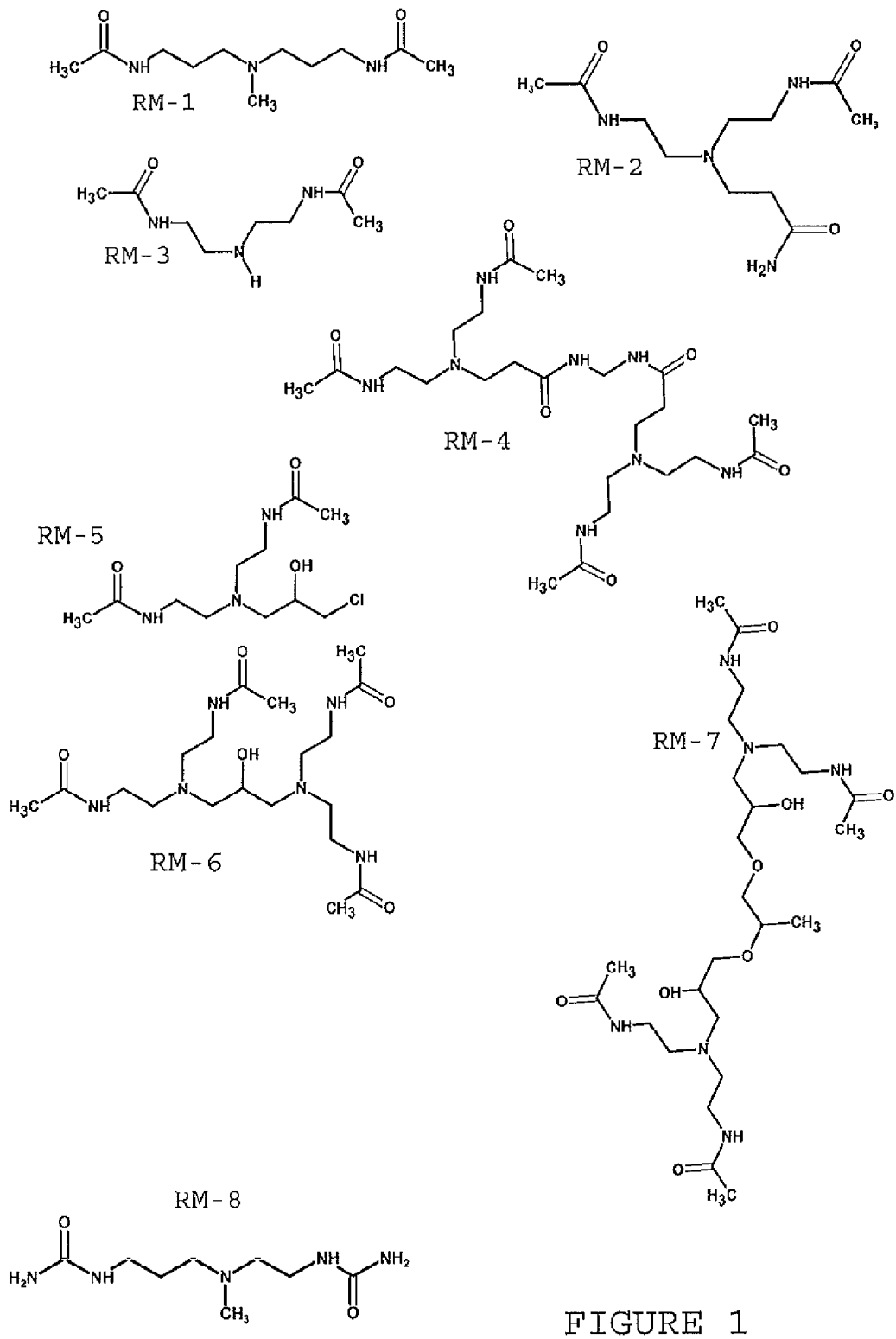
FIG. 1 illustrates a variety of reactive modifiers suitable for preparing an adhesive composition of the present invention.

The present invention relates to both a creping adhesive composition (adhesive system) and a method of creping in which the adhesive composition resident on the dryer surface, such as the heated surface of a Yankee dryer, forms as a consequence of reactions (e.g., thermosetting reactions) that take place on the surface of the dryer under the controlled conditions of the dryer.

In particular, the present invention is directed to a method of using a creping adhesive, and particularly an adhesive system that can be adapted so as to provide a way for controlling adhesion properties. The creping adhesive composition used in the present invention is obtained by combining a PAE polymer composition comprising a reactive, lightly crosslinked polyamidoamine-epihalohydrin polymer (a reactive, lightly crosslinked PAE-type polymer) optionally with a reactive modifier.

Creping adhesives having such combination of components can be optimized to improve the performance of the creping process in the production of paper webs, particularly when used with low moisture webs produced by using the through-air-drying (TAD) process. Further, the creping adhesive compositions used in the present invention can be optimized to enhance the binding of cellulosic fiber webs onto a drying surface and provide softer paper webs.

The adhesion properties of the adhesive system of the present invention can be systematically modified by varying the amount of crosslinking that can occur when the PAE polymer composition comprising the reactive, lightly crosslinked PAE-type polymer is dried by heating, optionally in the presence of the reactive modifier, and optionally in the presence of an accelerator or other modifier compound, on a dryer surface, such as on the surface of the Yankee dryer. Because adhesive crosslink density influences adhesive mechanical properties, such as the glass transition temperature ($T_g$) of the adhesive, by varying the amount of crosslinking which can occur in the adhesive composition one can influence the level of adhesion of the fibrous substrate onto the dryer surface, and accordingly one can control the relative ease or difficulty by which the fibrous substrate is released from the dryer surface. The amount of crosslinking can be varied by altering the preparation of the reactive, lightly crosslinked PAE-type polymer, i.e., the extent by which the PAE-type polymer is crosslinked during its preparation, and by altering the type and amount of the reactive modifier included in the adhesive composition.

In accordance with the present invention, the reactive modifier reacts with the reactive, lightly crosslinked polymer to attenuate and allow control of the reactivity of the polymer. The reactive (nucleophilic) modifiers react with a halohydrin, e.g., a chlorohydrin group, of the reactive PAE polymer to effectively reduce the amount of available halohydrin groups and thus reduce the degree of crosslinking that is available in the polymer and provide greater control of the crosslinking reaction on the dryer surface, such as on the surface of a Yankee drum.

The invention also relates to a process for applying the PAE polymer composition comprising a reactive, lightly crosslinked PAE-type polymer and optionally a reactive modifier without pre-crosslinking to achieve adhesion control on the dryer surface, e.g., Yankee dryer, through spray application.

This invention also relates to creped fibrous webs, such as creped tissue and creped paper towel, and a process for the manufacturing of these paper products utilizing the adhesive system of this invention.

The creping process of the present invention can include the steps of applying the creping adhesive composition, as defined above and further described in more detail hereinafter, to a drying surface, adhering a fibrous web to the drying surface by pressing the fibrous web against the surface, and creping the fibrous web with a creping device to dislodge it from the drying surface. The creping adhesive used in the present invention can also be applied to the heated surface by first applying the adhesive to the fibrous web, which then contacts the heated surface in the creping process.

The present invention introduces a new concept into the creping process. In particular, the thermosetting process is allowed to develop on the dryer surface under controlled conditions. The controllability of the adhesive coating performance creates the ability to obtain good tissue and towel creping properties under a wide range of operating conditions. The coating gives good creping performance under the highly demanding conditions of the Through-Air-Drying (TAD) process, which generally employs high drum temperatures and low moisture content. In addition, the coating can be controlled to provide good creping performance under high moisture conditions of conventional creping processes. Competitive products of the past have had to be carefully selected for each tissue machine and each specific set of conditions, and acceptable performance could be achieved only with a limited range of polymer chemistry. The present invention provides a very robust, high performance adhesive coating that can be employed over a much wider range of operating conditions.

In accordance with the present invention, the adhesive composition comprises a PAE composition comprising a reactive, lightly crosslinked PAE-type polymer optionally in combination with a reactive modifier.

The PAE-Type Polymer

General methods of preparing polyamidoamine-epihalohydrin polymers, i.e., PAE-type polymers are well known and are described, for example, in U.S. Pat. No. 2,926,116, U.S. Pat. No. 3,058,873 and U.S. Pat. No. 3,772,076, all of which are incorporated herein by reference.

In accordance with the present invention, suitable reactive, lightly crosslinked PAE-type polymers for use in a creping adhesive composition comprise polymers prepared by reacting (1) a prepolymer of (a) a diacid, or an ester of a diacid, and (b) a polyamide containing secondary or tertiary amine groups with (2) an epihalohydrin. The epihalohydrin is usually epichlorohydrin. The polyamide-amine groups are usually secondary amine groups derived from a polyalkylene polyamine, for example, polyethylene polyamines, polypropylene polyamines or polybutylene polyamines and the like. For example, the polyalkylene polyamine can be diethylene triamine, methyl bis(3-aminopropyl)-amine, triethylene tetramine, tetraethylene pentamine, dipropylene triamine, bishexamethylene triamine, bis-2-hydroxyethylethylene diamine, pentaethylylene hexamine, or hexaethylene heptamine. Usually, the polyamine is one of diethylenetriamine, methyl bis(3-aminopropyl)-amine, triethylene tetramine, or tetraethylene pentamine. The most often used polyamines are diethylenetriamine and methyl bis(3-aminopropyl)-amine. The diacid can be selected from such acids as malonic acid, succinic acid, glutaric acid, adipic acid, suberic acid and sebacic acid. Usually, the diacid is a saturated aliphatic dibasic carboxylic acid, often containing from about 3 to about 10 carbon atoms and mixtures thereof. Dicarboxylic acids containing from 4 to 8 carbon atoms are usually used, with adipic acid, or glutaric acid being most often used.

For example, to prepare a suitable prepolymer from the diacid and the polyalkylene polyamine, a mixture of the reactants can be heated at a temperature of about 110-250° C., usually about 125-200° C. and often about 160-200° C., at atmospheric pressure. In carrying out the reaction, an amount of dicarboxylic acid sufficient to react substantially completely with the primary amine groups of the polyalkylene polyamine but insufficient to react with the secondary amine groups to any substantial extent is generally used. This will usually require a mole ratio of polyalkylene polyamine to dicarboxylic acid from about 0.9:1 to about 1.2:1. However, a mole ratio of from about 0.8:1 to about 1.4:1 can usually be used with quite satisfactory results. Where a reduced pressure is employed, lower temperatures such as 75° C. to 150° C. may be utilized. The time of reaction depends on the temperatures and pressures that are used and will ordinarily vary from about ½ to 4 hours, although shorter or longer reaction times may be used depending on reaction conditions. In any event, the reaction is desirably continued to substantial completion for best results. This polycondensation reaction produces water as a byproduct, which is removed by distillation. At the end of this reaction, the resulting product usually is dissolved in water at a concentration of about 50% by weight total polymer solids.

Where a diester is used instead of diacid for reaction with the polyalkylene polyamine, the prepolymerization can be conducted at a lower temperature, preferably about 100-175° C. at atmospheric pressure. In this case, the byproduct will be an alcohol, the type of alcohol depending upon the identity of the diester. For instance, where a dimethyl ester is employed the alcohol byproduct will be methanol, while ethanol will be the byproduct obtained from a diethyl ester. Where a reduced pressure is employed, lower temperatures such as 75° C. to 150° C. may be utilized.

Polyamidoamine prepolymers that can be used for producing a reactive, lightly crosslinked polyamidoamine-epihalohydrin polymer that would be suitable in a creping adhesive composition of the present invention are usually synthesized under conditions leading to the formation of a pre-polymer composition typically having a weight average molecular weight (in Daltons) in the range of $10,000 \leq Mw \leq 300,000$ usually in the range of $10,000 \leq Mw \leq 100,000$, more usually in the range of $20,000 \leq Mw \leq 75,000$ and most often in the range of $25,000 \leq Mw \leq 65,000$, e.g., about 40,000 Daltons. Conditions conducive to the preparation of suitable prepolymers are well known to those skilled in the art, and can be identified with routine experimentation.

To produce a reactive, lightly crosslinked PAE-type polymer suitable for preparing a creping adhesive composition of the present invention, the amount of epihalohydrin introduced for reaction with the prepolymer is controlled or limited. In particular, the mole ratio of epihalohydrin to secondary amine groups in the prepolymer typically is kept below about 1.5:1, i.e., 1.5 molecules of epihalohydrin for each secondary amine group in the prepolymer. The mole ratio of epihalohydrin to the secondary amine groups in the polyamide prepolymer is usually between about 0.05:1 and about 1.5:1, and more often is between about 0.05:1 and about 1.25:1. In particular, the mole ratio of epihalohydrin to the secondary amine groups in the prepolymer is often less than 1.2:1, more often is less than 1.1:1 and most often is less than 1:1 and is generally in the range of 0.1:1 to 0.8:1, and is more often in the range of 0.2:1 and 0.7:1 and is most often in the range of 0.2:1 to 0.6:1.

As the available epihalohydrin, e.g., epichlorohydrin, reacts with secondary amines distributed along the backbone of the polyamide prepolymer, the more reactive epoxide functionality is initially consumed. This result is shown schematically in the following reaction:

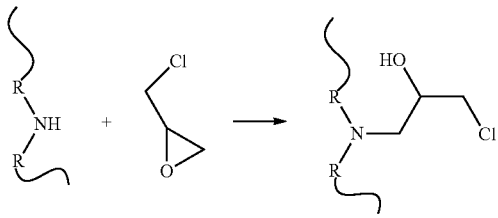

This reaction thus results in a structure that has the covalently bound halogen, e.g., chlorine, of the partially reacted epichlorohydrin available for further reaction with another secondary amine. When the terminal halogen, e.g., chlorine, functionality reacts with a secondary amine on another polyamide prepolymer molecule (i.e., participates in an alkylation reaction), a bridge (i.e., a crosslink) is formed between the two polymer chains and a chloride ion (via hydrochloric acid formation) is formed that is captured by a tertiary nitrogen in the form of an ammonium salt as follows:

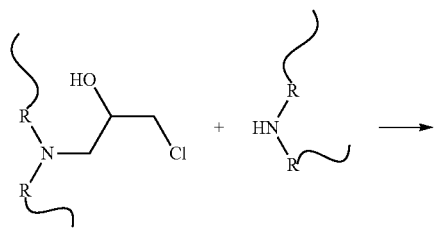

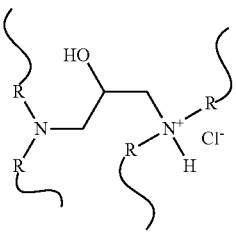

If all of the halogen, e.g., chlorine, functionality of the epihalohydrin is consumed, the PAE polymer so-formed would not have any residual reactivity (no further self-crosslinking ability). In that circumstance, the polymer would be fully crosslinked. A composition containing only PAE polymers with no residual reactive chlorine functionality is not self-reactive or thermosetting. In other words, the polymer is not self-crosslinkable. However, a PAE-type polymer that is only lightly crosslinked with an epihalohydrin, such as with epichlorohydrin, and having no residual reactive chlorine functionality still likely has multiple secondary amine groups; it is similar to the structure of the initial prepolymer with just some additional branching or inter-chain crosslinking. Additional secondary amines would be present and available for reaction with any other reactive chlorine functionality from different molecules having residual covalent bonded halogens (co-crosslinking process). The utility of such materials in blends with reactive, lightly crosslinked PAE polymers is described hereafter.

If none of the halogen, e.g., chlorine, functionality of the epihalohydrin is consumed, then the PAE polymer would not be crosslinked at all and the molecular weight and viscosity of the polyamide prepolymer would have changed very little by reaction with the epihalohydrin. Such a composition would be devoid of ionic chlorine and the total chlorine and covalent chlorine would be essentially the same. Such a composition represents the lower limit of a reactive, lightly crosslinked PAE polymer. In other words, applicants consider a reactive PAE polymer with no crosslinks at all to fall within the definition of lightly crosslinked, notwithstanding the possible difficulty or impracticality of being able to synthesize such material in practice. In accordance with the present invention, some amount of crosslinking generally is contemplated and expected. In that case, the resulting polymer will have a measurable amount of both covalent halogen, e.g., covalent chlorine, and ionic halogen, e.g., ionic chlorine.

The ratio between the covalent chlorine and the ionic chlorine depends to some extent on the ratio between epichlorohydrin and secondary amine and on the extent of the reaction conversion of covalent chlorine to ionic chlorine (crosslinking reaction). As discussed in more detail below, the ionic chlorine/covalent chlorine ratio can also be altered by mixing two or more reactive, lightly crosslinked PAE resins, or by mixing one or more reactive, lightly crosslinked PAE resins with a PAE resin that is crosslinked more completely, such as a fully crosslinked (though generally lightly crosslinked) PAE resin.

As a general rule, a suitable PAE polymer composition for a creping adhesive composition of the present invention will comprise a reactive, lightly crosslinked PAE-type polymer and the composition will have a total chlorine content of 0.1 to 10.0% by weight of polymer solids and a covalent chlorine content of 0.02% to 10.0% by weight of polymer solids. More often, the total chlorine content will be between 0.1 and 8% by weight of polymer solids and the covalent chlorine content will be between 0.1% and 6% by weight of polymer solids. Even more often, the total chlorine content will be between 0.1% and 6% by weight of polymer solids, and especially between 0.1% and 4% of polymer solids, and the covalent chlorine content will be between 0.12% and 4% by weight of polymer solids, and especially between 0.15% and 3% by weight of polymer solids. Most of the time, a lightly crosslinked PAE-type polymer having a total chlorine content of between 0.1% and 3% by weight of polymer solids and especially between 0.1% and 2% of polymer solids, and a covalent chlorine content of 0.15% to 2% by weight of polymer solids and especially 0.15% to 1.5% by weight of polymer solids will be used in formulating an adhesive composition of the present invention. The ionic chloride content of a PAE polymer is the difference between the total chlorine content and the covalent chlorine content.

Again, because a suitable PAE polymer composition for a creping adhesive composition of the present invention will comprise a reactive, lightly crosslinked PAE polymer, a certain amount of polymers in the composition will have residual pendant halohydrin, e.g., chlorohydrin, functionality on the polymer backbone. This pendant halohydrin is measured as covalent halogen, e.g., covalent chlorine. In suitable PAE polymer compositions for a creping adhesive composition of the present invention, the ratio (either on a mole or weight basis) between pendant chlorohydrin groups (covalent chlorine) and crosslinks (ionic chlorine) in the composition is usually between 0.01:1 and 100:1 (measured as the ratio of covalent chlorine:ionic chlorine). Often, the ratio between pendant chlorohydrin groups (covalent chlorine) and crosslinks (ionic chlorine) is between 0.05:1 and 10:1 and especially between 0.05:1 and 7.5:1. More often, the ratio between pendant chlorohydrin groups (covalent chlorine) and crosslinks (ionic chlorine) is between 0.05:1 and 7:1. Even more often, the ratio between pendant chlorohydrin groups (covalent chlorine) and crosslinks (ionic chlorine) is between 0.1:1 and 6:1. Most often, the ratio between pendant chlorohydrin groups (covalent chlorine) and crosslinks (ionic chlorine) is between 0.2:1 and 5:1. In particularly useful PAE polymer compositions for a creping adhesive composition of the present invention, the ratio between pendant chlorohydrin groups (covalent chlorine) and crosslinks (ionic chlorine) is between 0.25:1 and 2.5:1 and especially between 0.5:1 and 1.5:1.

In converting a polyamide prepolymer, formed as above-described, into a reactive, lightly crosslinked PAE-type polymer, the prepolymer is reacted with the epihalohydrin, usually epichlorohydrin, at a temperature from above about 0° C., more preferably from about 25° C., to about 100° C., and more often between about 35° C. to about 70° C. until the viscosity of a 20% solids solution at 25° C. has reached a viscosity of about a Gardener-Holdt C or higher. In accordance with the present invention, the extent of the reaction between the polyamide-epihalohydrin polymer and the epihalohydrin should be controlled so that the prepolymer is only lightly crosslinked with the epihalohydrin. The viscosity, measured using a Brookfield viscometer, for a 15% by weight solids solution generally should not exceed about 150 Centipoise (cP) (about FG on the Gardner Holdt scale) at 25° C. The Brookfield viscosity of the 15% by weight solids solution often will be at least about 5 cP (a viscosity of about A4 on the Gardner Holdt scale) at 25° C. More often, the Brookfield viscosity of the 15% by weight solids solution will be between 10 and 60 cP (a viscosity of about A3 to AB on the Gardner Holdt scale) at 25° C. Most often, the Brookfield viscosity of the 15% by weight solids solution will be between 12 and 25 cP (a viscosity of about A3 to A2 on the Gardner Holdt scale) at 25° C. Usually, the reaction should not be allowed to progress beyond the point where the viscosity, measured using a Brookfield viscometer, of a 20% solids solution at 25° C. has reached about 25 to 45 Centipoise (cP), (a viscosity of about A2 to A1a on the Gardner Holdt scale), normally, the viscosity should be no greater than 25 to 35 cP, (a viscosity of about A2-A1 on the Gardner Holdt scale) at 25° C.

The reaction between the polyamide prepolymer and the epihalohydrin is preferably carried out in aqueous solution to moderate the reaction. Although not necessary, pH adjustment can be done to increase or decrease the rate of residual crosslinking.

When the desired viscosity is reached, sufficient water can be added to adjust the solids content of the lightly crosslinked PAE polymer solution to a desired amount, e.g., to about 15 wt % more or less; the product can be cooled to about 25° C. and then stabilized to permit storage. While the solids content of the lightly crosslinked PAE polymer solution suitable for use as an adhesive is typically 15% by weight, the solids content generally could range between 10% and 35% by weight.

One can improve the stability of the lightly crosslinked PAE polymer to resist gelation by adding sufficient acid to reduce the pH to less than about 6, usually to less than about 5, and most often to less than about 4. Any suitable inorganic or organic acid such as hydrochloric acid, sulfuric acid, methanesulfonic acid, nitric acid, formic acid, phosphoric acid and acetic acid may be used to stabilize the product. Non-halogen containing acids, such as sulfuric acid, are often used.

The weight average molecular weight of suitable PAE polymer compositions for a creping adhesive composition of the present invention will broadly range from about 60,000 up to about 1,000,000 to 1,500,000 Daltons, more usually from about 150,000 to 800,000 Daltons, most often from about 300,000 to 450,000 Daltons. In particular, the reaction between the polyamide (e.g., polyamidoamine) prepolymer and the halohydrin will have increased the molecular weight of prepolymers from 1.5 to 20 times, and usually from 2 to 10 times, from what it was originally.

Usually, the weight average molecular weight for a reactive, lightly crosslinked PAE-type polymer is in the range between 150,000 and 800,000 Daltons and most often between 300,000 and 450,000 Daltons. As known by those skilled in the polymer molecular weights can be determined using Gel Permeation Chromatography (GPC), which allows for the determination of a polymer's polydispersity index, as well as its viscosity molecular weight ($M_v$). Based on other data, the number average ($M_n$), the weight average ($M_w$) and the size average ($M_z$) molecular weights also can be determined.

A suitable GPC method uses tetrahydrofuran as a solvent/diluent and a system of two mixed C chromatographic columns preceding a 500 Angstroms PLgel column, all available from Polymer Laboratories (now part of Varian, Inc.). The column arrangement is calibrated using a range of polystyrene standards. For determining the molecular weight of a particular resin sample, the sample is injected along with polystyrene, such as having a molecular weight of 250,000 daltons, and toluene as an internal standard. A Model 759A Absorbance Detector from Applied Biosystems is used to monitor the column output and assist the molecular weight determination. The method of determining the molecular weight of a polymer sample is well understood by those skilled in the art, and other configurations and reference materials can conveniently be used.

Typical property values for suitable aqueous reactive, lightly crosslinked PAR-type polymers are as follows:
Viscosity at 25° C. of 5 cPs to 200 cPs (e.g., 16 cPs)
Solids content of 8% to 30% by weight (e.g., 15%)
pH of 2.5 to 6.5 (e.g., 4.7)
Ionic chloride of 0.05% to 1.5% by weight (e.g., 0.35%)
Covalent chloride of 0.01% to 1.5% by weight, usually 0.1% to 1.5% by weight (e.g., 0.30%)

The present invention is not limited to any specific manner for preparing a creping adhesive composition comprising a reactive, lightly crosslinked PAE polymer. For example, one can simply synthesize a single PAE-type polymer composition that itself constitutes a reactive, lightly crosslinked PAE polymer by using an appropriate amount of the epihalohydrin to synthesize the polymer from a suitable prepolymer and allowing the reaction to proceed until an intended balance of covalent chlorine and ionic chlorine is reached in the polymer composition. This approach is shown in Example 1 below. Alternatively, one can blend different PAE-type polymers having different levels of covalent chlorine and ionic chlorine to arrive at a composition having the intended balance between covalent chlorine and ionic chlorine. For example, one might blend a non-reactive, lightly crosslinked PAE polymer, i.e., a PAE polymer which is fully crosslinked and in which the total chlorine and the ionic chlorine are substantially the same, with one or more separate PAE polymers that is/are crosslinked very little, if at all, where the total chlorine and the covalent chlorine are substantially the same. Other options for blending PAE polymers within the spectrum of different levels of crosslinking and different levels of reactivity will be apparent to those of ordinary skill in the art in view of the present disclosure.

These PAE polymer compositions for use as a creping adhesive composition in accordance with the present invention comprising reactive, lightly crosslinked PAE-type polymers are generally supplied as a concentrated aqueous dispersion, i.e., usually above about 20% by weight solids, and are then diluted in order to be easily sprayed onto a dryer surface, such as onto the cylinder of a Yankee dryer, or onto a semi-dry tissue web. As used herein, the term "aqueous dispersion" refers to adhesive compositions consisting predominantly of water and containing the reactive, lightly crosslinked PAE-type polymer homogeneously distributed throughout the composition. The essential element is the homogeneity of the composition. While it is not necessary for all of the components of the aqueous dispersion to be dissolved at the molecular level, the term "aqueous dispersion" does encompass the more restrictive term "aqueous solution".

As used herein, a PAE polymer composition suitable for use as a creping adhesive composition in accordance with the present invention usually has both measurable covalent halogen and ionic halogen functionality and exhibits a noticeable change in properties when heated to 105° to 150° C. Such PAE polymer compositions contain a reactive, lightly crosslinked PAE-type polymer, which is a PAE-type polymer that has measurable covalent halogen and generally has measurable ionic halogen content as well. In a reactive, lightly crosslinked PAE-type polymer, the epihalohydrin, e.g., epichlorohydrin, is reacted only partially, leaving the other reactive site available for further reaction. Recall an epihalohydrin has two reactive sites, i.e., the epoxide moiety and the alkyl chloride moiety. In a reactive, lightly crosslinked PAE-type polymer there often will be some crosslinks between polymer chains and some pendant reactive halohydrin, e.g., chlorohydrin, residues along the polymer backbone. In particular, there will be a measureable level of covalent halogen, such as chlorine, due to and in proportion to the pendant halohydrin groups.

A reactive, lightly crosslinked PAE-type polymer, therefore, has a latent level of reactivity as a function of the pendant halohydrin, e.g., chlorohydrin, functionality. A reactive, lightly crosslinked PAE-type polymer is self-crosslinkable, or thermosetting. A reactive, lightly crosslinked PAE-type polymer generally has both secondary amine moieties and reactive halohydrin, e.g., chlorohydrin, groups present in the same molecules and/or in different molecules. Tertiary amine moieties are found where there are existing crosslinks.

As a PAE composition comprising reactive, lightly crosslinked PAE-type polymers is heated, pendant halohydrin, e.g., chlorohydrin, moieties may react with secondary amine moieties, converting them to tertiary amines and increasing the molecular weight of the polymer. The aqueous solution of the PAE composition comprising reactive, lightly crosslinked PAE-type polymers can be treated with any number of organic or inorganic acids to impart different water durability characteristics to dried films of the polymer. Typical acids employed are sulfuric, phosphoric, formic, hydrochloric, or acetic acids, or with any blends of these acids.

Because of its latent reactivity, the molecular weight of a PAE composition comprising reactive, lightly crosslinked PAE-type polymers can be modified in a controlled manner, which can be used to adjust its water solubility and its adhesive performance as part of a creping adhesive composition. This aspect of controlled modification is a key aspect of the present invention.

A PAE composition comprising a reactive, lightly crosslinked PAE polymer shows an increase in its glass transition point ($T_g$) after every heating/cooling cycle with a corresponding increase in film adhesion (by Peel Adhesion) and an increase in its non-water-soluble fraction. Also, mild heating of a sample of a PAE composition comprising a reactive, lightly crosslinked PAE polymer shows a substantial increase in solution viscosity and polymer molecular weight over time, which does not occur with simply a non-reactive, fully crosslinked polymer (regardless of whether it is lightly crosslinked).

Thus, a PAE composition comprising a reactive, lightly crosslinked PAE-type polymer inherently possesses an adjustable adhesion level and an adjustable water resistance. The present invention provides a way for capitalizing on these inherent attributes through the conjoint use of a reactive modifier.

In contrast, a non-reactive, crosslinked PAE-type polymer is a PAE-type polymer that does not exhibit a noticeable change in properties when heated to 105 to 150° C. For instance, the glass transition point ($T_g$) of the polymer remains virtually unchanged after repeated heating/cooling cycles. The properties of a non-reactive, crosslinked PAE-type polymer, for use as a creping adhesive, are limited by its molecular weight. A non-reactive, crosslinked PAE-type polymer has essentially no pendant chlorohydrin groups and all of the titratable chloride is ionic in nature. A non-reactive, crosslinked PAE-type polymer has a ratio of covalent chlorine to ionic chlorine below 0.01:1.

As noted above, one or more reactive, lightly crosslinked PAE-type polymers of the present invention can be used in the absence of any non-reactive, crosslinked PAE-type polymer to make a PAE composition-based creping adhesive composition. Alternatively, as also noted above, a non-reactive, crosslinked PAE-type polymer, or alternatively a polyamidoamine prepolymer of the type used to prepare PAE polymers as described earlier, or both, could be blended with a reactive, lightly crosslinked PAE-type polymer of the present invention to produce a PAE composition which moderates the performance characteristics of the adhesive composition.

As used herein, the terms "cellulosic fiber web, fibrous web, tissue paper web, paper web, web and cellulosic fiber product" all refer to sheets of paper made by a process which comprises forming a papermaking furnish, depositing the furnish onto a foraminous surface, removing water from the web (by gravity or vacuum-assisted drainage, with or without pressing, and by evaporation), and the steps of adhering the sheet in a semi-dry condition to a heated drying surface, such as a Yankee Dryer, completing the water removal by evaporation to an essentially dry state, removing the sheet by a creping blade such as a doctor blade, and winding the resultant sheet onto a reel. Typically, the moisture content of the web sheet, e.g., paper, delivered to the creping equipment will be between 5% and 85% by weight. The web can be comprised of various types of natural and recycled fibers including wood pulps of chemical and mechanical types. The web can be composed of up to 100% recycled fibers. The fibers can comprise hardwood, softwood and cotton fibers. The tissue web can also contain particulate fillers, fines, as well as process chemicals used in the paper-making process such as strength additives, softeners, surfactants and organic polymers.

Reactive Modifiers

As noted above, the adhesion properties of the adhesive system of the present invention can be systematically modified by varying the amount of crosslinking that can occur when the reactive, lightly crosslinked PAE-type polymer is dried by heating in the presence of a reactive modifier. Because adhesive crosslink density influences adhesive mechanical properties, such as the glass transition temperature ($T_g$) of the adhesive, by varying the amount of crosslinking which can occur in the adhesive composition one can influence the level of adhesion of the fibrous substrate onto the dryer surface, and accordingly one can control the relative ease or difficulty by which the fibrous substrate is released from the dryer surface. The amount of crosslinking typically is varied by altering the preparation conditions of the reactive, lightly crosslinked PAE-type polymer, i.e., the extent by which the PAE-type polymer is crosslinked during its preparation, and/or by altering the type and amount of the reactive modifier or other materials included in the adhesive composition.

The reactive modifiers are compounds having a chemical structure similar to the adhesive itself (e.g., similar to prepolymer, amidoamine-based compounds, that form the foundation for the PAE-type polymer), but having a much lower molecular weight. Thus, suitable reactive modifiers have residual secondary and/or tertiary amine function. In particular, the weight average molecular weight of suitable reactive modifiers should generally be below about 5,000 Daltons, is usually below 2,000 Daltons and is most often below 1,000 Daltons. The lower limit for the reactive modifier's molecular weight is governed only by its volatility. The volatility of a reactive modifier cannot be so high such (the molecular weight cannot be so low) that the volatility of the reactive modifier interferes with the creping process. In particular, the reactive modifier is too volatile if heat associated with the creping process prevents a sufficient amount of the reactive modifier from being retained in the creping adhesive composition on the surface of the dryer during the creping operation, i.e., if too much of the reactive modifier evaporates before it can influence the creping process then it is too volatile.

The reactive modifier is a compound that can control (i.e., attenuate, inhibit or retard) the alkylation process (e.g., the formation of crosslinks by reaction between secondary amine moieties and pendant halohydrin, e.g., chlorohydrin, moieties) by reacting with covalent chlorine without causing a significant increase in the adhesive PAE polymer molecular weight. Thus, the reactive modifier provides a way to control the crosslinking process. Suitable reactive modifiers are capable of reacting with pendant halohydrin, chlorohydrin, moieties on the reactive, lightly crosslinked PAE-type polymer. Suitable reactive modifiers also can function as plasticizers for the PAE adhesive as well. The reactive modifier can be added to either the adhesive composition (i.e., to the reactive, lightly crosslinked PAE-type polymer) or to a release aid, or could be applied independently to the dryer surface during the creping process. Blends of different reactive modifiers also can be used along with some other plasticizers (such as di-ethanol amine, tri-ethanol amine, glycerin or polyglycerin) for mixture with the creping adhesive composition.

Suitable reactive modifiers can be produced by a reaction between a polyalkylenepolyamine, such as DETA (i.e., diethylenetriamine) or N-methyl-3,3'-diaminopropylamine (NM-DAPA), and 2 moles of an electrophile such as a carboxylic acid, e.g., acetic acid (AcA), methylene-bis-acrylamide (MBA) or urea. Adducts based on DETA, for example, retain residual secondary amine functionality, which can be further reacted with an additional electrophile, such as acrylamide (AAm), epichlorohydrin (Epi), or propylene glycoldiglycidalether (PGDGE) to create tertiary amines. Conditions suitable for preparing reactive modifiers from these materials are illustrated in Example 5 and other suitable conditions will be apparent to those skilled in the art. A variety of suitable reactive modifiers are illustrated in FIG. 1 and their component parts (monomers) are detailed in the following Table.

| Reactive Modifier Crosslinking Agent | Component 1 | Component 2 | Component 3 |
| --- | --- | --- | --- |
| RM-1 | 1 mole NMDAPA | 2 moles AcA | — |
| RM-2 | 1 mole DETA | 2 moles AcA | 1 mole AAm |
| RM-3 | 1 mole DETA | 2 moles AcA | — |
| RM-4 | 1 mole MBA | 2 moles DETA | 4 moles AcA |
| RM-5 | 1 mole DETA | 2 moles AcA | 1 mole Epi |
| RM-6 | 2 moles DETA | 4 moles AcA | 1 mole Epi |
| RM-7 | 2 moles DETA | 4 moles AcA | 1 Mole PGDGE |
| RM-8 | 1 mole NMDAPA | 2 moles urea | — |

The amount of reactive modifier for combining with the PAE composition comprising a reactive, lightly crosslinked PAE-type polymer can be varied over a wide range and is selected to vary the properties of the adhesive composition such as insolubility, rewetability, density, cross-linking, brittleness and to reduce or increase the tack or adhesion properties of the adhesive mixture. In this manner, the properties of the creping adhesive can be readily adjusted so that the creping adhesive is optimized for a given drier and wood pulp composition. The ability to control these physical properties allows the operator to control more precisely the desired properties of the creping adhesive. In effect, the operator can regulate the desired creping adhesive properties by varying the amount of reactive modifier relative to the reactive, lightly crosslinked PAE-type polymer. In general, for a constant degree of cross-linking by the epihalohydrin, as the concentration of reactive modifier increases the insolubility, rewetability, density, and brittleness increase and the degree of adhesion and tack tends to decrease. Usually, the weight ratio of reactive modifier solids to polymer solids in the PAE polymer composition comprising the reactive, lightly crosslinked PAE polymer will be in the range of 1000:1 to 1:1.

While on an absolute basis, the concentration of the reactive modifier is low in the creping adhesive, the concentration of reactive modifier is typically higher than the stoichiometric level desired for moderating the crosslinking reactions. As noted above, excess, unreacted modifier serves as a plasticizer. Since only a few reactive modifier molecules actually participate in reactions with the reactive, lightly crosslinked PAE-type polymer, there always are excess molecules of the modifier. At these concentrations, di-functional or multi-functional reactive modifier molecules have potentially no effect on contributing to any crosslinking process if the molecule reacts in two steps with both functionalities. With the first step the modifier is reacted as a mono-functional compound and the second or other functionality is then in such a low concentration as compared with the un-reacted modifier that it has no impact on the process. In other words, at low conversion, which is typical for the crosslinking process, and from the statistical point of view, multi-functional modifiers behave as mono-functional compounds. The first reaction changes the subsequent reactivity of any available, remaining amine function.

Usually, in order to adequately fulfill it purpose as a modifier of the creping process when used in combination with a reactive, lightly crosslinked PAE-type polymer, the reactive modifier will be used in an amount between about 0.1 to 25% by weight of PAE solids, e.g., reactive, lightly crosslinked PAE-type polymer solids. For example, if the reactive, lightly crosslinked PAE-type polymer is being used in an amount of 5 pounds of reactive, lightly crosslinked PAE-type polymer solids per ton of pulp or paper solids, then the reactive modifier will be added in an amount between about 0.005 to 1.25 pounds per ton. Most often, the reactive modifier will be added in an amount between about 1 to 10% by weight of PAE solids, e.g., reactive, lightly crosslinked PAE-type polymer solids.

Release Agent/Aid

Due to the flexibility in the ability to manipulate the crosslinking process (i.e., the weight ratio between the reactive, lightly crosslinked PAE-type polymer and the reactive modifier), one can tailor the creping adhesive composition of the present invention to a wide variety of paper machines. One particularly advantageous way to practice this invention is to add the reactive modifier to the release aid or release agent in a range of concentrations. In this way, one manipulates the creping process by varying the amount of reactive modifier in the release aid and the amount of release aid that is used. In the broad practice of the present invention, the weight ratio between creping adhesive and release aid can range from 10:90 to 1000:1.

In one embodiment, the release agent composition can be based on a quaternized imidazoline (e.g., methyl and ethyl sulfate salts of quaternary imidazoline derived from fatty acids), possibly including a mineral oil, or a vegetable oil or a blend thereof. Alternatively, the release aid may be an oil-based dispersion of paraffinic oil, naphthenic oil, a vegetable oil or a blend thereof. The imidazoline-based release aid itself may have an adjustable viscosity, which can be varied by using a mixture of high boiling compounds as a solvent for the quaternized imidazoline.

The quaternary imidazoline release aid is typically supplied as a mixture containing 90% by weight imidazoline and 10% by weight diethylene glycol, which then can be dissolved in a high boiling point solvent. For example, 20 to 80% by weight of the quaternary imidazoline may be dissolved in 80 to 20% by weight of a solvent. The solvent can be a mixture of (a) polyethylene glycol, having a weight average molecular weight of 200 to 600 Daltons (20 to 40% by weight of the solvent), (b) polyethylene glycol monooleate (with 9 units of Ethylene Oxide) (10 to 40% by weight of the solvent), (c) propylene glycol (0 to 20% by weight of the solvent), (d) triethanolamine (0-15% by weight of the solvent), and (e) diamidoamine (0-7% by weight of the solvent). Alternatively, the surfactant choice for the release aid may also be a mixture of PEG 400 dioleate, PEG 600 dioleate, mineral oil and/or vegetable oil. Additionally, other secondary amines, such as diethanolamine and monoethanolamine, also may be included.

In other embodiments, the quaternary imidazoline release aid can also be used in conjunction with oil based release aids to permit further flexibility in controlling the creping process.

The secondary and tertiary amine moieties in amidoamine and imidazoline release aids, thus constitute suitable reactive modifiers in accordance with the present invention, as such compounds are able to control the thermosetting process of a PAE composition containing a reactive, lightly crosslinked PAE-type polymer. Such low molecular weight compounds with a secondary or tertiary amine group are water soluble and compatible with the PAE-type adhesive composition of the present invention. For example, quaternized imidazoline is a major component of a release aid currently supplied by the assignee of the present application. According to U.S. Pat. No. 4,109,094 the cyclization product will normally contain about 8-10% primary and secondary amine groups. During the quaternization of the imidazoline, the unreacted amidoamine is also converted to a tertiary amine. During the creping process, such as on a Yankee dryer, the temperature of the dryer surface reaches 100-105° C. At that temperature, and in the presence of water, the derivatives of imidazoline can hydrolyze yielding reactive amine functionality that then serve as reactive modifiers.

The creping adhesive compositions of the present invention can also be used in conjunction with conventional release agents and other modifiers for the Yankee dryer coating. Such release agents can include the well known oil-based release agents or the plasticizer-based release agents described in U.S. Pat. No. 5,660,687 and U.S. Pat. No. 5,833,806, which are incorporated herein by reference. A release agent such as silicone oil, other oils, surfactants, soaps, shampoos, or conventional additives for creping adhesives or other adhesives, can either be applied between the dryer and the web, or, for example, mixed with the adhesive, to limit the extent of adhesion. Other release agents, humectants, or plasticizers which modify adhesion of the web to the drying surface, can also used in conjunction with the creping adhesives of this invention. Such agents include water soluble polyols, glycols, glycerol, sobitol, polyglycerin, polyethylene glycols, sugars, oligosaccharides, hydrocarbon oils and blends.

The properties of the creping adhesive of the present invention also can be varied, as desired, by means of certain additional additives. For example, tackifiers, surfactants, dispersants, salts which are effective to adjust water hardness, acids or bases for adjusting the pH of the composition or other useful additives may be incorporated into the composition, in accordance with common practice in the industry. Again, the creping composition may include polyols, such as glycerol, propylene glycol, ethylene glycol, polyethylene glycol, alkylpolyglucoside (APG) and the like, which may serve multiple purposes, such as surfactants and/or co-solvents and/or viscosity modifiers.

The adhesive composition of the present invention is preferably applied to the dryer surface at a rate, relative to the rate of dryer surface rotation, which provides an adequate amount of adhesive to hold the web during drying yet release the dried web upon completion of drying. Conventional adhesive coverage rates and weights can be used as are known to those skilled in the art. Exemplary application rates of the adhesive on the dryer surface can range from about 0.01 mg/m$^2$ to as much as 500 mg/m$^2$, or more, for example, from about 0.01 mg/m$^2$ to about 100 ing/m$^2$. Low application rates of 0.01 mg/m$^2$ to about 10 mg/m$^2$, based on the solids weight of the adhesive composition are surprisingly effective. Indeed, the adhesive system of the present invention has exhibited good adhesion and creping performance at very low add-on rates, i.e., application rates of the adhesive on the dryer surface between 0.01 mg/m$^2$ to about 2.0 mg/m$^2$. Preferably, the adhesive is continuously applied to the rotating dryer so that an adequate amount of adhesive is always on the dryer surface.

Other teachings of creping systems, methods, and adhesives are described in the following U.S. Pat. Nos. which are incorporated herein in their entireties by reference: U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,879,257; 4,684,439; 3,926,716; 4,883,564; and 5,437,766.

As noted earlier, a phosphate compound such as phosphoric acid or phosphate salts also may be added to the composition to improve the flowability and wetting properties of the adhesive composition on the Yankee dryer and to reduce the hard film build-up on the creping surface of the Yankee dryer. The addition of phosphoric acid or phosphate salts also has the effect of promoting the anti-corrosion property of the adhesive composition. If a phosphate additive is used, the amount will normally be in the range of about 5 to about 25 weight percent, based on the total weight of the adhesive composition.

Fibrous webs are creped using the adhesive compositions of this invention by: (1) applying the adhesive composition described above to a drying surface for the web or to the web; (2) pressing the fibrous web against the drying surface to effect adhesion of the web to the drying surface; and (3) dislodging the web from the drying surfaces with a creping device such as a doctor blade to crepe the fibrous web. Preferably, in step (1), the adhesive composition is applied to the drying surface for the web. The preferred fibrous web is a cellulosic web.

Figure 2:
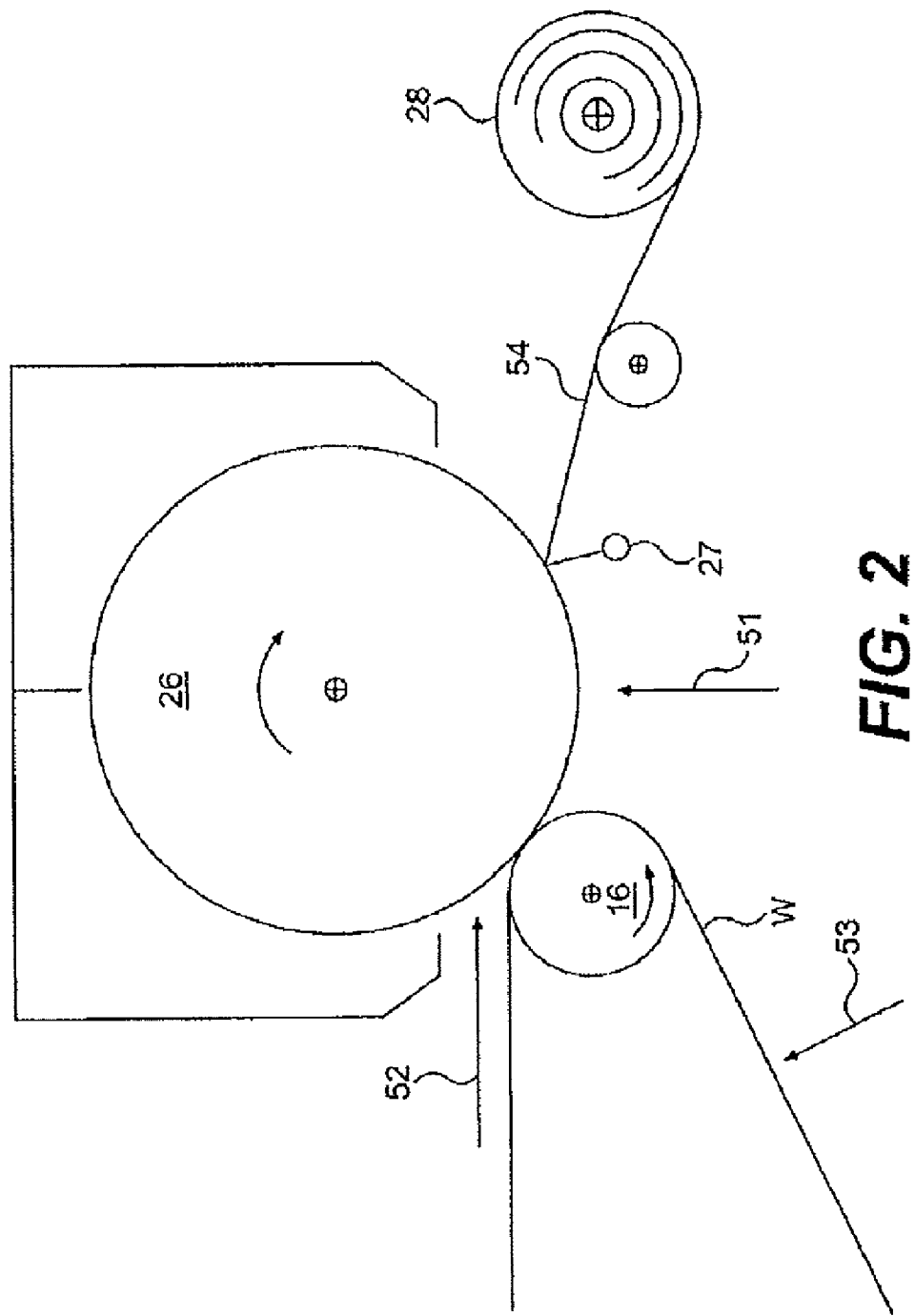
FIG. 2 schematically illustrates a Yankee dryer and the application of the creping adhesive composition comprising a reactive, lightly crosslinked PAE-type polymer with a reactive modifier, as a component of the release agent, by spraying the adhesive and release agent onto the surface of the Yankee dryer or onto the surface of the web.

FIG. 2 schematically illustrates the drying and creping of a cellulosic web to produce tissue and towel. According to this embodiment of the process of the invention, the creping adhesive, comprising a PAE polymer composition and including a reactive, lightly crosslinked PAE-type polymer and a reactive modifier, is sprayed directly on the Yankee dryer (26) at position 51. In the event it is desired to use softeners, these can be sprayed on the air side of the web from position 52 or 53 as shown in FIG. 2. Usually, the PAE polymer composition comprising a reactive, lightly crosslinked PAE-type polymer and a retention aid are sprayed separately but almost simultaneously on the heated Yankee surface.

Usually, the various components of the adhesive formulation, may all be dissolved, dispersed, suspended, or emulsified in water. Water often comprises at least about 85% and often from about 90 to 99% by weight of the total weight of the creping adhesive package.

Referring to the drawing in FIG. 2, this represents one of a number of possible configurations used in processing tissue and towel products. In this particular arrangement, the transfer and impression fabric carries the formed, dewatered web W around a turning roll to the nip between press roll 16 and Yankee dryer 26. The fabric, web and dryer move in the directions indicated by the arrows. The entry of the cellulosic web to the dryer is positioned well around the roll from creping blade 27 which, as schematically indicated, crepes the traveling web from the dryer as indicated at 27. The creped web, at 54, exiting from the dryer is wound into a soft creped tissue, or towel at roll 28. To adhere the nascent web W to the surface of the dryer, a spray 51 of adhesive and release aid is applied to the surface ahead of the nip between the press roll 16 and Yankee roll 26. Alternately, the spray may be applied to the traveling web W directly as shown at 53. Suitable apparatus for use with the present invention are disclosed in the prior art, see for example U.S. Pat. No. 4,304,625 and U.S. Pat. No. 4,064,213, which are hereby incorporated by reference.

This schematic illustration does not incorporate all the possible configurations used in presenting a nascent web to a Yankee dryer. It is used only to describe how the adhesive compositions of the present invention can be used to promote adhesion and thereby influence the crepe of the product. The present invention can be used with all processes that rely upon creping the web from a dryer surface. In the same manner, the method of application of the adhesive to the surface of the dryer or the web is not restricted to spray applications, although these are generally the simplest method for adhesive application.

The creping adhesive system of the present invention is useful for the preparation of fibrous webs which are creped to increase the thickness and bulk of the web and to provide texture to the web. The invention is particularly useful in the preparation of final products such as facial tissue, toilet tissue, paper towels, and the like.

Nitrogenous softeners/debonders can suitably be added in the paper manufacturing process. The softener may suitably be added with the furnish, but is preferably sprayed from position 53 as shown in FIG. 2, or also sprayed to the sheet while the sheet is on the Yankee as shown in FIG. 2 position 52.

Usually, the creping adhesive is applied in an aqueous solution or dispersion containing from about 0.1 to about 20 weight percent of the PAE composition comprising a reactive, lightly crosslinked PAR-type polymer composition. More often, the polymer composition is in solution or dispersion at the level of about 0.25 to about 15 weight percent, and most often at about 0.5 to about 10 weight percent.

For the amount of creping adhesive to apply, on a dry weight basis, a minimum amount of about 0.0005 weight percent of a PAE composition comprising reactive, lightly crosslinked PAE-type polymer solids based on the dry weight of the pulp or paper is generally used. A more usual minimum amount of a PAE composition comprising reactive, lightly crosslinked PAR-type polymer to apply is about 0.001 weight percent. The usual maximum amount of polymer composition that is applied to the surface of the dryer is about 1 weight percent based on the dry weight of the pulp or paper. A more often maximum is about 0.5 weight percent, and most often the maximum amount of a PAE composition comprising reactive, lightly crosslinked PAE-type polymer to apply is about 0.1 weight percent of the pulp or paper. Thus, the total amount of the PAE composition comprising reactive, lightly crosslinked PAE-type polymer to apply to the dryer surface is usually from about 0.01 lb/ton to about 2.2 lb/ton (5 g/ton to 1000 g/ton) based on the dry weight of the PAE composition comprising reactive, lightly crosslinked PAR-type polymer and the dry weight of the paper web being treated.

The drying surface most commonly used in commercial operations is a Yankee dryer, and the aqueous adhesive composition will most often be applied to the creping cylinder or drum by spraying. Alternatively, however, it can be added by application to the fibrous web, preferably by spraying. In the case of cellulose webs, i.e. paper, the creping adhesive can be added at the wet end of the paper machine by application to the wet web.

In one embodiment, the method is used to prepare tissue paper with a basis weight between about 10 g/m$^2$ and about 50 g/m$^2$ and, more usually, between about 10 g/m$^2$ and about 30 g/m$^2$. The density of the tissue products is between about 0.03 g/m$^3$ and about 0.6 g/cm$^3$, and more usually, between about 0.05 g/cm$^3$ and 0.2 g/cm$^3$.

Softness is the tactile sensation perceived by a consumer as the consumer holds a particular product, rubs it across the skin, or crumples it within a hand. This tactile sensation is provided by a combination of several physical properties. One of the most important physical properties related to softness is generally considered by those skilled in the art to be the stiffness of the paper web from which the product is made. Stiffness, in turn, is usually considered to be directly dependent on the strength of the web.

Strength is the ability of a paper product, and its constituent web, to maintain physical integrity and thus to resist tearing, bursting, and shredding under use conditions.

Bulk, as used herein, refers to the inverse of the density of a paper web, e.g., a tissue paper web. It is another important part of real and perceived performance of tissue paper webs. Enhancements in bulk generally add to the cloth like, absorbent perception of the product. An important portion of the bulk of a tissue paper web is imparted by the creping process.

It will be understood that while the invention has been described in conjunction with specific embodiments thereof, the foregoing description and examples are intended to illustrate, but not limit the scope of the invention.

EXAMPLES

Measuring properties and changes in properties of Creping Adhesive-Release agent products on an operating commercial Yankee drum is not practically possible. However, a good understanding of adhesive properties can be obtained from various laboratory test techniques. Among the most informative of these tests are (i) Film Durability, (ii) Peel Adhesion, and (iii) Cylinder Probe Adhesion. The creping performance properties obtained from lab tests can be used to predict, and then control, performance on a commercial Yankee drum.

Durability testing provides an indication of how well an adhesive forms a desirable, durable coating on a Yankee drum, and the ability of the adhesive to resist washing off of the drum with process water from the process. Durability units, as shown in the Table below, are reported as "% Insoluble Polymer." The "% Insoluble Polymer" is a measure of the Durability, or resistance to water, of the crepe adhesive as a dried film.

According to the procedure, a film casting of crepe adhesive is prepared by pouring 50 grams of liquid polymer at 15% by weight polymer solids into a 4"×4" aluminum mold. This amount of liquid polymer provides 7.5 grains of dried polymer film. The mold with liquid polymer solution is placed in a forced air oven at 85° C. for 15 hours to dry the adhesive. The temperature is then increased to 125° C. for an additional 3 hours, and then the mold with dried film is removed and allowed to cool in a dessicator. The dried film is excised from the mold and a 2 gram piece of dried film sample is weighed. The 2 gram sample is placed in a 250 mL beaker containing 100 grams of deionized (DI) water at 70° C. The sample is vigorously stirred in the heated DI water with a magnetic stir bar for 5 minutes. The complete contents of the beaker (water, soluble film, insoluble film) are then filtered through a wire mesh screen and all insoluble material is collected on the screen. This insoluble material is then dried in a forced air oven for 3 hours at 100° C. The recovered, dried polymer is then weighed and the "% Insoluble Polymer" is calculated as grams recovered-dried polymer film/grams initial dry film sample X 100%. The final result is expressed as the mean (average) of 3 replicates.

High durability is generally preferred. However, it has been observed in commercial applications that if a coating has high durability coupled with a fully crosslinked backbone and high molecular weight, the coating may become hard and brittle, causing poor creping and reduction in doctor blade life.

Peel Adhesion testing of a potential creping adhesive composition is considered an indicator of tissue web adhesion that will be developed on a Yankee drum dryer. In accordance with this test, a cloth strip (220 threadcount cotton cloth 1 inch×10 inches) is pressed with a roller onto a steel coupon (platen-Q-lab metal panels 2.5 inches×10 inches, low carbon steel, 0.2-0.3 µm roughness) coated with fixed amount of liquid adhesive applied as a liquid containing 15% by weight solids. The cotton strip is soaked in deionized water until completely wet and then pressed between blotters to remove excess water. A steel platen is coated with the adhesive sample using a No. 40 Wire Rod to provide a uniform film. The wet cotton strip is placed on the platen and rolled once with a weighted roll. The platen with the adhered cloth is heated at 190° F. (88° C.) for 2 minutes, and then the strip is peeled (peeled length 5 inches) in a perpendicular direction from the steel platen (i.e., at an angle of 90°) at constant speed (24 inches per minute) using a Thwing-Albert tensile tester. The average force required to remove the strip from the platen is measured. Reported units in the Table below are grains-force/inch ($g_f$/in). For the reported valuses, ten (10) individual peel measurements are made and the average (Mean Peel Adhesion) is reported.

Cylinder Probe Adhesion testing is another measurement used to assess the utility of a potential creping adhesive composition. This test measures the adhesive force properties of a polymer subjected to the repeated contact and displacement of a cylinder probe into a heated sample on a metal platen. The test is conducted in a constant humidity environment (30%±2% Relative Humidity) using a platen heated to a temperature of 70° C. before applying the adhesive sample. The reported Cylinder Probe Adhesion value is the maximum force (grams force-$g_f$) measured by the cylinder probe through a series of 30 displacements over a 30 minute period. The force is a measure of the maximum adhesion developed as the sample is concentrated by evaporation over time. The test is conducted using the TA.XT Plus Texture Analyzer, available from Texture Technologies Corp., a Heat exchanger module available from Exponent Stable Micro Systems and a round compression probe TA-8, ¼ inch diameter, round tip, stainless steel. Texture Expert Exponent Software, by Stable Micro Systems, Ltd. (Texture Exponent 32 (TEE32)) is a 32-bit software package which drives the TA.XT Plus Texture Analyzer.

Ionic Chlorine (as chloride ion-percent by weight based on the weight of the liquid sample) can be measured by any well-known technique, including by titration, or by correlation with electrical conductivity measurements. One convenient method employs a Chloride Ion-Selective Electrode (ISE) designed for the detection of chloride ions (Cl⁻) in aqueous solutions.

Covalent Chlorine (percent by weight based on the weight of the liquid sample) is calculated by subtracting the measured ionic chlorine value of a sample from a measurement of the total chlorine content of the sample. Total chlorine can be measured by a digestion procedure well-known to those skilled in the art.

For example, the Total chlorine content of an adhesive polymer sample (i.e., a PAE-type polymer) can be determined by refluxing the liquid polymer sample in the presence of potassium hydroxide to convert all covalently-bound chlorine to chloride ion, neutralizing with nitric acid and titrating the chloride ion content with a silver nitrate solution (e.g., a 0.1N silver nitrate solution) using a Brinkmann 716 Autotitrator or equivalent, with a Brinkmann E 649 stir plate or equivalent and a Brinkmann "Metrohm" electrode 020924209 (silver billet) or equivalent. The following equation shows the titration of chloride ion with silver nitrate:

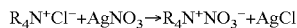

$$R_4N^+Cl^- + AgNO_3 \rightarrow R_4N^+NO_3^- + AgCl$$

The total chlorine is therefore the sum of both covalently-bound chlorine and ionic chlorine.

The ionic chloride test is a measure of the chloride ion content of the PAE resin as manufactured. The potassium hydroxide boil (digestion) is eliminated from the above-described procedure because the covalent chlorine is not titrated.

The covalently bound chorine then is calculated as the difference between the total chlorine measurement and the ionic chlorine measurement.

Example 1

Preparation of a Lightly Crosslinked PAE-Type Polymer

Polyamidoamine Prepolymer

To a 2 L reactor equipped with a stainless steel stir shaft, heating element, and reflux/distillation condenser was added 600 g of diethylenetriamine (5.82 mole). To this with stirring was added 877 g of solid adipic acid (6.00 mole) slowly over 30 minutes. The reaction exothermed from room temperature to about 145° C. over this time, and reflux was observed. After all of the adipic acid was added the reaction was slowly heated to about 155° C. and the condenser was changed to distillation. Water was removed from the reactor until the viscosity of a diluted sample reached a desirable value. At that point, the condenser is switched back to reflux and water is added slowly to dilute the reaction mixture. The final viscosity (measured at 25° C.) is about 300 cP at 45% solids. The molecular weight MW measured by GPC is about 40,000 Daltons.

PAE-type Polymer Crepe Adhesive (PAE-1)

To a 2 L reactor is charged 452 g of a 45% by weight solution of the prepolymer (prepared as in Example 1), i.e., about 0.96 moles of secondary amine. An additional 731 grams of water is added. The mixture is heated to about 35° C. and 34 g of epichlorohydrin (0.37 moles) is added slowly and the viscosity advancement was monitored. When the viscosity reaches the value of 28 cP (measured at 25° C.), the reaction mixture is diluted with an additional 490 g water and the pH is adjusted with phosphoric acid to 4.2. The reaction mixture is cooled and its total solids content is adjusted to 15%. The viscosity of the diluted solution (measured at 25° C.) is about 16 cP.

Example 2

Comparison of PAE-Type Polymers

Table I compares the properties of a reactive, lightly crosslinked PAE-type polymer of the present invention (PAE-1) with other commercially available PAE-type creping adhesives (PAE-2 through PAE-5) available both from Georgia-Pacific as Unicrepe Products (PAE-2 through PAE-4) and a prior art PAE adhesive (PAE-5). The high level of chlorohydrin functionality in the PAE-type adhesive of the present invention is evidenced by the relatively high level of covalent chlorine measured in the polymer. Molecular weights were measured by GPC. Note also that the molecular weight of PAE-1 is relatively low.

TABLE I

| Adhesive | Mw (×10⁵ Daltons) | % Covalent Chlorine |
|---|---|---|
| PAE-1 | 3.20 | 0.32 |
| PAE-2 | 8.60 | 0.08 |
| PAE-3 | 0.93 | 0.00 |
| PAE-4 | 11.0 | 0.00 |
| PAE-5 | 3.50 | 0.085 |

Example 3

Comparison of Properties of PAE-Type Polymers

Table II provides a comparison of creping performance of an adhesive of the present Invention with other commercially available adhesives. In particular, reported in Table II are measured property values of a reactive, lightly crosslinked PAE-type polymer of the present invention (PAE-1) as compared with other commercially available PAE-type creping adhesives (PAE-2 through PAE-5) available both from Georgia-Pacific as Unicrepe Products (PAE-2 through PAE-4) and from another commercial source (PAE-5).

TABLE II

| Adhesive | Durability | Peel Adhesion | Cylinder Probe |
|---|---|---|---|
| PAE-1 | 94 | 255 | 197 |
| PAE-2 | 89 | 213 | 176 |
| PAE-3 | 0 | 175 | 209 |
| PAE-4 | 91 | 273 | 117 |
| PAE-5 | 90 | 197 | 173 |

The adhesive of the present invention (PAE-1) gives very good adhesion, comparable to the high adhesion developed by a very high molecular weight, non-reactive crosslinked adhesive, e.g., PAE-4. Note that the initial molecular weight of PAE-1 is significantly lower than that of PAE-4 (Table I); but the latent reactivity of the reactive, lightly crosslinked PAE-type polymer of the present invention (PAE-1) generates an increase in molecular weight during the Yankee drying process as a result of additional crosslinking due to heating and evaporation.

The reactive, lightly crosslinked PAE-type polymer of the present invention (PAE-1) also gives very high Cylinder Probe Adhesion results, a result that is statistically comparable to that developed with the very aggressive polymer PAE-3. PAE-3 has been seen to provide a very tacky coating on a Yankee drum as a result of its relatively low MW. Unfortunately, the very low durability of PAE-3 makes this a less desirable polymer for Yankee dryer applications. All of the adhesives except PAE-3 provide good durability.

As shown in Table 2, the test results obtained for PAE-1 in both the Peel Adhesion testing and the Cylinder Probe Adhesion testing is indicative of the robust range of operability of PAE-1 under a wide range of creping conditions. Furthermore, the ability to modify the reactivity of PAE-1 with reactive modifiers also allows for increased flexibility in applications using the coating package of the present invention.

Example 4

Preparation of a Release Agent

To a 2 L reactor is charged 561 g PEG 200, 204 g propylene glycol and 374 g polyethylene glycol monooleate (9 EO's) and mixed for 10 minutes at 25° C. Imidazoline Quat (561 g) (CAS #68016-01-3) is added and the composition is mixed for 20 minutes at 25° C. The final clear solution has a viscosity of 132 cPs.

Example 5

Synthesis of a Reactive Modifier

To a 2 L reactor is charged 725 g (5 moles) of 3,3'-Diamino N-methyl dipropyl amine (NMDAPA) and 600 g glacial acetic acid (10 moles) is added drop wise. The temperature increases to 85° C. After the addition of the acetic acid was completed, the reaction mixture was heated to 145-165° C. and distilled water was collected. After cooling to 105° C., the reaction mixture was further diluted with 355 g water.

Example 6

Use of a Reactive Modifier

An adhesive of the present invention (PAE-1) was mixed with a series of reactive modifiers, RM-1 through RM-4 and tested for durability, peel adhesion, and both wet and dry tack in the cylinder probe test. As a basis for comparison, the adhesive PAE-1 also was mixed with a non-reactive modifier (glycerin) identified below as M-5. The weight ratio of the adhesive to modifier was 80:20 on a solids basis. While it is expected that this represents a relatively high level of reactive modifier, it has been selected in order to clearly demonstrate any effect due to the additive and it is still within practical range of useful adhesive:modifier weight ratios expected to be used in field applications on commercial tissue machines.

Table III presents the test results, which, except for the Cylinder Probe Dry Tack, are expressed as a percentage of the unmodified adhesive (PAE-1). Cylinder Probe Dry Tack is expressed in standard units (grams force).

TABLE III

| Modifier | Durability | Peel Adhesion | Cylinder Probe Wet Tack | Cylinder Probe Dry Tack |
|---|---|---|---|---|
| None | 100 | 100 | 100 | 2 |
| RM-1 | 98 | 83 | 77 | 9 |
| RM-2 | 96 | 78 | 96 | 8 |
| RM-3 | 101 | 88 | 86 | 8 |
| RM-4 | 101 | 85 | 99 | 1.2 |
| M-5 | 88 | 75 | 106 | 84 |

For blends of PAE-1 with Reactive Modifiers RM1-RM4, there is a reduction in the Peel Adhesion and/or Wet Tack (Cylinder Probe Adhesion) compared to the control PAE-1 without modifier. The amine component of the reactive modifier alkylates the chlorohydrin of the partially crosslinked adhesive, thereby reducing the amount of latent reactivity of the adhesive and rendering the adhesive less reactive to Peel Adhesion and Wet Tack testing. It is important to note that there is substantially no change in the Durability value of PAE-1 reacted with modifiers RM1-RM4, while PAE-1 mixed with the non-reactive material M5 (glycerin) shows a significant reduction in Durability.

These results demonstrate that incorporation of a reactive modifier into the polymer adhesive does not change the water solubility of the polymer, and that the non-reactive modifier performs only as a water-soluble diluent in the durability test. The non-reactive modifier M5 glycerin shows a significant reduction in film durability of PAE-1, as that fraction of the film simply dissolves when treated with water. Also, PAE-1 mixed with the M5 glycerin shows a marked increase in Wet Tack and Dry Tack, as glycerin is widely known to perform as a humectant (Wet Tack) and plasticizer (Dry Tack) when mixed with adhesive polymers. The reactive modifiers RM1-RM3 show moderate effect as plasticizers with PAE-1.

Based upon these experiments, it is possible to estimate the effect of attenuating the reactivity of the PAE-1 adhesive with a reactive modifier on a commercial Yankee tissue machine.

Example 7

Yankee Dryer Trial

A commercial twin wire tissue machine operating at 4800 fpm speed utilized a widely accepted commercial creping adhesive and release agent package. The tissue manufacturer wished to increase the drying temperature of the Yankee drum in order to increase productivity and produce a softer sheet with improved bulk. On attempting to continue with the commercial crepe adhesive and release package under these more severe conditions, the coating on the Yankee drum became hard and brittle and formed a dark brown appearance. Excessive amounts of lint dust and brown residue also accumulated in the dryer hood section. The hardened coating reduced sheet adhesion, increased doctor blade chatter, and reduced doctor blade life significantly.

A creping adhesive and release agent package of the present invention was introduced into the commercial operation, (see Examples 2 and 3). The aqueous adhesive solution of the PAE polymer (Example 1) is mixed with the release aid (Example 4) in a weight ratio of PAE polymer:release aid of 40:60 and with a phosphate solution, and this mixture is sprayed on the Yankee dryer surface by a spray nozzle apparatus. Almost immediately, the Yankee drum turned from the historical brown, caramel color to a light white haze color. Within the first 24 hours, the machine speed was increased by over 275 fpm (+7%), and the production rate was increased by 24 tons/day on the specific tissue paper grade being produced. Overall during the first week of running the adhesive and release package of the present invention through the complete paper grade structure, the machine speed was increased to 5200 fpm, compared to the 4850 fpm historical average when using the previous coating package, i.e., a 7.2% increase. Improved Yankee protection was documented by improving blade wear by 80% over all grades produced on the tissue machine (min/wear/hr). In addition, a significant improvement was also observed in product qualities upon substituting the creping adhesive of the present invention for the previous used adhesive. For example, the sheet bulk increased measurably, e.g., an increase in the range of 3 to 6%.

Example 8

Comparison of PAE-Type Polymers

Table IV compares the properties of a reactive, lightly crosslinked PAE-type polymer of the present invention (PAE-1) with the previously mentioned commercially available PAE-type creping adhesive (PAE-5).

TABLE IV

| Property | PAE-5 | PAE-1 |
|---|---|---|
| Prepolymer MW | Not available | ~40,000 Daltons |
| Viscosity cP @ 15% | 17 | 16 |
| % Total Cl | 0.698 | 0.670 |
| % Ionic Cl | 0.613 | 0.350 |
| % Covalent Cl | 0.085 | 0.320 |
| Ratio Cov/Ionic | 0.139 | 0.914 |
| Mw Adhesive | 350,000 | 320,000 |
| Mn | 37,000 | 52,000 |
| Mz | 3,890,000 | 1,980,000 |

PAE-1 and PAE-5 have very similar molecular weight; approx. 320,000 vs. 350,000 Daltons, respectively. PAE-1 however has significantly higher covalent chlorine functionality (pendant chlorohydrin) than PAE-5, which is a distinguishing property of the PAE-1 of the present invention. PAE-1 and PAE-5 also have very similar total chlorine content, adjusted to 15% total polymer solids (total chlorine=ionic chlorine+covalent chlorine). The total chlorine content of the polymer solution is directly proportional to the epichlorohydrin used in the reaction (if chlorine is not introduced by other raw materials and it is assumed that it was not for these materials). The molecular weight of the adhesive is a result of the crosslinking reaction between the secondary amine of the prepolymer backbone and pendant covalent chlorine of the reactive chlorohydrin adduct (prepolymer reacted with epichlorohydrin).

The reduced level of covalent chlorine content of PAE-5, along with similar total chlorine content and the relative Mw of PAE-5 and PAE-1 suggests that the Mw of the prepolymer used to make PAE-5 must be much less than the molecular weight of the prepolymer used to make PAE-1. Further, the degree of crosslinking and polymer branching of PAE-5 must be higher than that of PAE-1. The higher degree of branching in PAE-5 is evidenced in the significantly higher Mz measured for this material, which is a measure of the larger molecules in the molecular weight distribution. (See previous Table).

If PAE-5 were prepared from a prepolymer of the same molecular weight used to prepare PAE-1, then the Mw of the final PAE-5 would be expected to be much higher than the Mw of PAE-1, considering that the total chlorine content (epi amount) is the same for both polymers, and the covalent chlorine content of PAE-5 is significantly less than that of PAE-1, i.e., significantly more of the epichlorohydrin is consumed in cross-linking reactions.

The present invention discloses a creping adhesive composition having an adjustable adhesion level and adjustable water resistance.

In a further embodiment, the present invention is:
1. A creping adhesive composition which is in liquid form comprising a polyamidoamine-epihalohydrin polymer composition comprising a reactive, lightly crosslinked polyamidoamine-epihalohydrin polymer.
2. The creping adhesive composition according to the preceding paragraph wherein the polyamidoamine-epihalohydrin polymer composition has at least 0.02% of covalent halogen by weight of polymer solids,
3. The creping adhesive composition according to the preceding paragraph wherein the reactive, lightly crosslinked polyamidoamine-epihalohydrin polymer is prepared by reacting (1) a prepolymer of (a) a diacid, or an ester of a diacid, and (b) a polyamide containing secondary or tertiary amine groups with (2) an epihalohydrin, wherein the prepolymer has a weight average molecular weight of 10,000 to 100,000 Daltons.
4. The creping adhesive composition according to the preceding paragraphs wherein the polyamidoamine-epihalohydrin polymer composition has at least 0.1% of covalent halogen by weight of polymer solids.
5. The creping adhesive composition according to the preceding paragraphs wherein the epihalohydrin is epichlorohydrin and the halogen is chlorine.
6. The creping adhesive composition according to the preceding paragraphs wherein the polyamidoamine-epihalohydrin polymer composition has between 0.1 and 6% of covalent chlorine by weight of polymer solids.
7. The creping adhesive composition according to any of the preceding paragraphs wherein the reactive, lightly crosslinked polyamidoamine-epichlorohydrin polymer is prepared by reacting (1) a prepolymer of (a) a diacid, or an ester of a diacid, and (b) a polyamide containing secondary or tertiary amine groups with (2) an epihalohydrin, wherein the prepolymer has a weight average molecular weight of 10,000 to 300,000 Daltons.
6 The creping adhesive composition according to any of the preceding paragraphs comprising a combination of the polyamidoamine-epihalohydrin polymer composition and a reactive modifier.
7. The creping adhesive composition according to any of the preceding paragraphs wherein the polyamidoamine-epihalohydrin polymer composition has a minimum covalent chloride content of 0.12% by weight of polymer solids.
8. The creping adhesive composition according to any of the preceding paragraphs wherein the polyamidoamine-epichlorohydrin polymer composition has a ratio of covalent chlorine to ionic chlorine between 0.01: and 100:1.
9. The creping adhesive composition according to any of the preceding paragraphs wherein the polyamidoamine-epichlorohydrin polymer composition comprises a blend of reactive, lightly crosslinked polyamidoamine-epichlorohydrin polymers.
10. The creping adhesive composition according to any of the preceding paragraphs wherein the polyamidoamine-epihalohydrin polymer composition comprises a blend of (a) a reactive, lightly crosslinked polyamidoamine-epichlorohydrin polymer and (b) a polyamidoamine-epichlorohydrin polymer having a ratio of covalent chlorine to ionic chlorine below 0.01:1.
11. The creping adhesive composition according to any of the preceding paragraphs wherein the reactive modifier has a molecular weight below about 5,000 Daltons and has either or both secondary and tertiary amine moieties.
12. The creping adhesive composition according to any of the preceding paragraphs wherein the reactive modifier is prepared by reacting a polyalkylenepolyamine with an electrophile.
13. The creping adhesive composition according to any of the preceding paragraphs wherein the polyalkylenepolyamine is selected from diethylenetriamine or N-methyl-3,3'-diaminopropylamine.

14. The creping adhesive composition according to any of the preceding paragraphs wherein the electrophile is selected from a carboxylic acid, methylene-bis-acrylamide, or urea.

15. The creping adhesive composition according to any of the preceding paragraphs wherein reactive modifier solids and polyamidoamine-epihalohydrin polymer composition solids are in a weight ratio in a range of 1000:1 to 1:1.

16. The creping adhesive composition according to any of the preceding paragraphs wherein the reactive modifier is a component of a release aid.

17. The creping adhesive composition according to any of the preceding paragraphs comprising a plasticizer selected from the group consisting of water soluble polyols, glycols, glycerol, sobitol, polyglycerin, polyethylene glycols, sugars, oligosaccharides, hydrocarbon oils and blends.

18. A method of creping cellulosic fiber webs which comprises: a) applying a creping adhesive to a drying surface; b) adhering a cellulosic fiber web to the drying surface; and c) dislodging the web from the drying surface; wherein the creping adhesive comprises a polyamidoamine-epihalohydrin polymer composition comprising a reactive, lightly crosslinked polyamidoamine-epihalohydrin in polymer.

19. The method according to the preceding paragraph wherein the polyamidoamine-epihalohydrin polymer composition has at least 0.1% of covalent halogen by weight of polymer solids 20. The method according to the preceding paragraphs wherein the reactive, lightly crosslinked polyamidoamine-epichlorohydrin polymer is prepared by reacting (1) a prepolymer of (a) a diacid, or an ester of a diacid, and (b) a polyamide containing secondary or tertiary amine groups with (2) an epihalohydrin, wherein the prepolymer has a weight average molecular weight of 10,000 to 100,000 Daltons.

21. The method according to any of the preceding paragraphs wherein the creping adhesive comprises a combination of the polyamidoamine-epihalohydrin polymer composition, a reactive modifier and optionally a release aid.

22. The method according to any of the preceding paragraphs wherein the applying step comprises separately applying (1) a creping adhesive comprising the polyamidoamine-epihalohydrin polymer composition of reactive, lightly crosslinked polyamidoamine-epihalohydrin polymer and (2) a reactive modifier to the drying surface for combination on the drying surface.

23. The method according to any of the preceding paragraphs wherein a release aid also is applied to the drying surface.

24. The method according to any of the preceding paragraphs wherein the release aid is selected from an imidazoline base or an oil-based dispersion.

25 The method according to any of the preceding paragraphs wherein the oil-based dispersion comprises paraffinic oil, naphthenic oil, a vegetable oil or a blend thereof 26. The method according to any of the preceding paragraphs wherein the imidazoline base comprises a methyl or ethyl sulfate salt of quaternary imidazoline derived from fatty acids.

27. The method according to any of the preceding paragraphs wherein the reactive modifier is a component of the release aid.

28. The method according to any of the preceding paragraphs wherein the creping adhesive and release aid are applied in a weight ratio between 10:90 to 1000:1.

29. The method according to any of the preceding paragraphs wherein the drying surface comprises the drying surface of a Yankee Dryer.

30. The method according to any of the preceding paragraphs wherein the drying surface comprises the drying surface of a Yankee Dryer.

31. The method according to any of the preceding paragraphs wherein the drying surface comprises the drying surface of a TAD Process.

32. The method according to any of the preceding paragraphs wherein the polyamidoamine-epihalohydrin polymer composition comprising a reactive, lightly crosslinked PAE-type polymer is applied to the dryer surface in an amount from 0.01 lb/ton to 2.2 lb/ton based on the dry weight of the polymer and the dry weight of the cellulosic fiber being creped.

33. The method according to any of the preceding paragraphs wherein the cellulosic fiber web has a content of recycled fibers of up to 100%.

34. The method according to any of the preceding paragraphs wherein the cellulosic fiber web has a moisture content ranging from about 5% to about 85% by weight.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and typically the variation is only about + or −2%.

We claim:

1. A creping adhesive composition which is in liquid form comprising a polyamidoamine-epihalohydrin polymer composition comprising a reactive, lightly crosslinked polyamidoamine-epihalohydrin polymer, wherein the polyamidoamine-epihalohydrin polymer composition has at least 0.1% of covalent halogen by weight of polymer solids.

2. The creping adhesive composition of claim 1 wherein the epihalohydrin is epichlorohydrin and the halogen is chlorine.

3. The creping adhesive composition of claim 2 wherein the polyamidoamine-epihalohydrin polymer composition has between 0.1 and 6% of covalent chlorine by weight of polymer solids.

4. The creping adhesive composition of claim 3 wherein the polyamidoamine-epihalohydrin polymer composition has a minimum covalent chloride content of 0.12% by weight of polymer solids.

5. The creping adhesive composition of claim 2 wherein the polyamidoamine-epichlorohydrin polymer composition has a ratio of covalent chlorine to ionic chlorine between 0.01:1 and 100:1.

6. The creping adhesive composition of claim 5 wherein the polyamidoamine-epichlorohydrin polymer composition comprises a blend of reactive, lightly crosslinked polyamidoamine-epichlorohydrin polymers.

7. The creping adhesive composition of claim 5 wherein the polyamidoamine-epihalohydrin polymer composition comprises a blend of (a) a reactive, lightly crosslinked polyamidoamine-epichlorohydrin polymer and (b) a polymer selected from the group consisting of (i) a polyamidoamine-epichlorohydrin polymer having no covalent chlorine, (ii) a polyamidoamine prepolymer, or (iii) a mixture thereof.

8. The creping adhesive composition of claim 1 wherein the reactive, lightly crosslinked polyamidoamine-epihalohydrin polymer is prepared by reacting (1) a prepolymer of (a) a diacid, or an ester of a diacid, and (b) a polyamide containing secondary or tertiary amine groups with (2) an epihalohydrin, wherein the prepolymer has a weight average molecular weight of 10,000 to 300,000 Daltons.

9. The creping adhesive composition of claim 1 comprising a combination of the polyamidoamine-epihalohydrin polymer composition and a reactive modifier.

10. The creping adhesive composition of claim 9 wherein the reactive modifier has a molecular weight below about 5,000 Daltons and either or both secondary and tertiary amine moieties.

11. The creping adhesive composition of claim 10 wherein the reactive modifier is prepared by reacting a polyalkylenepolyamine with an electrophile.

12. The creping adhesive composition of claim 11 wherein the polyalkylenepolyamine is selected from diethylenetriamine or N-methyl-3,3'-diaminopropylamine.

13. The creping adhesive composition of claim 11 wherein the electrophile is selected from a carboxylic acid, methylene-bis-acrylamide, or urea.

14. The creping adhesive composition of claim 10 wherein reactive modifier solids and polyamidoamine-epihalohydrin polymer composition solids are in a weight ratio in a range of 1000:1 to 1:1.

15. The creping adhesive composition of claim 14 wherein the reactive modifier is a component of a release aid.

16. The creping adhesive composition of claim 1 comprising a plasticizer selected from the group consisting of water soluble polyols, glycols, glycerol, sobitol, polyglycerin, polyethylene glycols, sugars, oligosaccharides, hydrocarbon oils and blends.

17. A creping adhesive composition which is in liquid form comprising a polyamidoamine-epihalohydrin polymer composition comprising a reactive, lightly crosslinked polyamidoamine-epihalohydrin polymer, wherein the polyamidoamine-epihalohydrin polymer composition has at least 0.02% of covalent halogen by weight of polymer solids and wherein the reactive, lightly crosslinked polyamidoamine-epihalohydrin polymer is prepared by reacting (1) a prepolymer of (a) a diacid, or an ester of a diacid, and (b) a polyamide containing secondary or tertiary amine groups with (2) an epihalohydrin, wherein the prepolymer has a weight average molecular weight of 10,000 to 100,000 Daltons.

18. A method of aping cellulosic fiber webs which comprises: a) applying a creping adhesive to a drying surface; b) adhering a cellulosic fiber web to the drying surface; and c) dislodging the web from the drying surface; wherein the creping adhesive comprises a creping adhesive composition of claim 1.

19. The method of claim 18 wherein the creping adhesive comprises a creping adhesive composition of claim 8.

20. The method of claim 18 wherein the creping adhesive comprises a creping adhesive composition of claim 9.

21. The method of claim 18, wherein the applying step comprises separately applying (1) a creping adhesive comprising the polyamidoamine-epihalohydrin polymer composition and (2) a reactive modifier to the drying surface for combination on the drying surface.

22. The method of claim 21 wherein a release aid also is applied to the drying surface.

23. The method of claim 22 wherein the release aid is selected from an imidazoline base or an oil-based dispersion.

24. The method of claim 23 wherein the imidazoline base comprises a methyl or ethyl sulfate salt of quaternary imidazoline derived from fatty acids.

25. The method of claim 23 wherein the oil-based dispersion comprises paraffinic oil, naphthenic oil, a vegetable oil or a blend thereof.

26. The method of claim 23 wherein the reactive modifier is a component of the release aid.

27. The method of claim 26 wherein the creping adhesive and release aid are applied in a weight ratio of creping adhesive:release aid between 10:90 to 1000:1.

28. The method of claim 22 wherein the creping adhesive and release aid are applied in a weight ratio of creping adhesive:release aid between 10:90 to 1000:1.

29. The method of claim 18, wherein the applying step comprises applying a mixture of (1) a creping adhesive comprising the polyamidoamine-epihalohydrin polymer composition, (2) a reactive modifier and (3) a release aid to the drying surface.

30. The method of claim 18, wherein the drying surface comprises a drying surface of a Yankee Dryer.

31. The method of claim 18, wherein the drying surface comprises a drying surface of a TAD process.

32. The method of claim 18 wherein the polyamidoamine-epihalohydrin polymer composition is applied to the dryer surface in an amount from 0.01 lb/ton to 2.2 lb/ton based on the dry weight of the polymer and the dry weight of the cellulosic fiber being creped.

33. The method of claim 18 wherein the cellulosic fiber web has a content of recycled fibers of up to 100%.

34. The method of claim 18 wherein the cellulosic fiber web has a moisture content ranging from about 5% to about 85% by weight.

* * * * *